Patented Sept. 11, 1923.

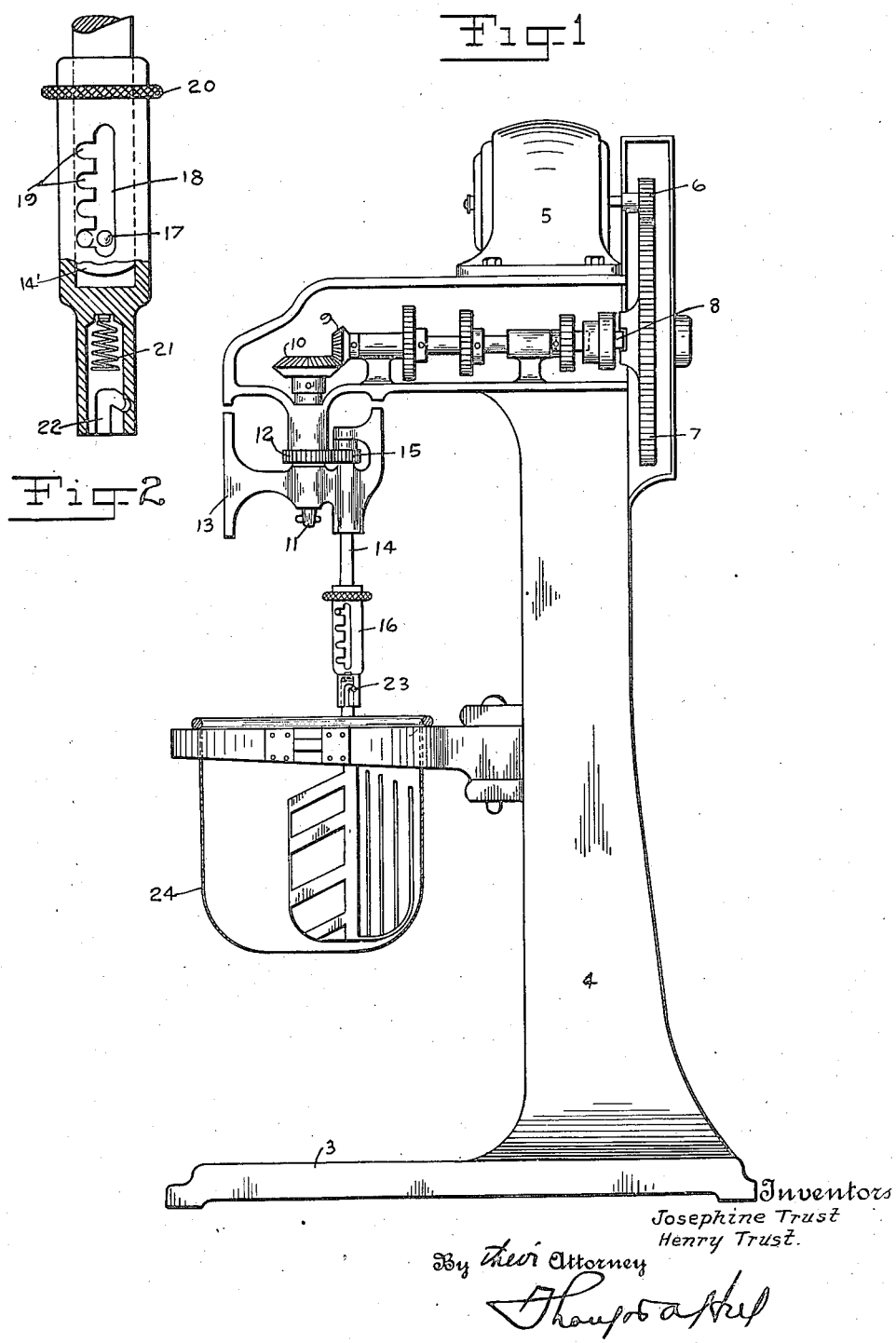

1,467,820

UNITED STATES PATENT OFFICE.

JOSEPHINE TRUST AND HENRY TRUST, OF PARK RIDGE, NEW JERSEY, ASSIGNORS, BY MESNE ASSIGNMENTS, TO FITCHBURG MACHINE WORKS, OF FITCHBURG, MASSACHUSETTS, A CORPORATION OF MASSACHUSETTS.

FOOD MACHINE.

Application filed September 18, 1919. Serial No. 324,607.

*To all whom it may concern:*

Be it known that we, JOSEPHINE TRUST and HENRY TRUST, citizens of the United States, residing at Park Ridge, in the county of Bergen and State of New Jersey, have invented certain new and useful Improvements in Food Machines, of which the following is a specification, reference being had therein to the accompanying drawing.

Our invention relates to improvements in food machines and has particular reference to an adjustable chuck therefor, adapted for controlling the height of the tool through operation.

Referring to the accompanying drawings, Fig. 1 illustrates in side elevation partly broken away and partly cross section, a suitable form of machine embodying an application of my invention and Fig. 2 is an enlarged detail partly in cross section illustrating the construction of the chuck.

3 is the base supporting the standard 4 upon the top of which is mounted the motor 5 provided with a driving pinion 6 meshing with the gear 7 upon the shaft 8 at the opposite end of which is mounted the bevelled gear 9 meshing with the bevelled gear 10 upon the shaft 11 which also carries the gear 12 secured to the carriage 13 in which is mounted the spindle 14 provided with a pinion 15 meshing with said gear 12. 16 indicates the chuck, the upper part of which is in the form of a sleeve or socket receiving the end 14' of the spindle 14 which is provided with a pin 17 projecting through the slot 18 which is also provided with a series of recesses 19. 20 indicates a suitable knurled band or ring for rotating the chuck between the fingers. The lower part of the chuck is also recessed or sleeve-like and is provided with a spring such as 21 and is provided with a slot in the side wall thereof, as indicated by 22 to receive the pin 23 of the tool, forming a sort of bayonet lock therefor, the spring 21 serving to retain the tool seated therein as shown.

For the purpose of adjusting the height of the tool within the pail 24, the sleeve 16 may be rotated until the pin 17 is within the longitudinal slot 18 after which it can be raised or lowered until the pin 17 comes opposite the particular side passage 19 into which it is to be seated according to the height of the tool desired. The rotation of the spindle 14 being rightwise looking at Fig. 2, maintains the seating of the pin 17, within the particular recess 19 into which it is to be engaged.

The tool here employed is a beater or whipper 25 shown arranged within the pail 24 and operated through the medium of the tool holder or chuck 16. This beater is provided with a central stem 26 and at one side are arranged a plurality of obliquely disposed extensions shown at 27. At the other side of the stem 26, we provide vertical, upstanding members 28. The operation of this beater is to cut the material, horizontally and vertically, an operation most important in whipping sponge cake batter or other mixtures, which it is desirable to thoroughly aerate.

The connection between the tool 25 and the shaft 14 is particularly designed to permit removal of the tool from the shaft without the necessity of previously displacing the food container 24. When the sleeve or chuck 16 is in its lowest position as shown in Fig. 1, the tool 25 is adjacent the bottom of the container 24. If it is desired to remove the tool the sleeve 16 is moved toward the upper limit of its adjustment as shown in Fig. 2, thereby raising the tool 25 sufficiently so that it may be detached from the bayonet lock by an axial movement without striking the bottom of the container 24. The sleeve or chuck 16 thus serves the combined purpose of securing the tool in driving relation to the shaft in any desired elevation and also in permitting the tool to be removed without displacing the container.

Of course, it will be understood that various modifications may be made in the construction and arrangement of parts without departing from the spirit of the invention as claimed:

We claim:

1. In a food mixing machine, a food container, a mixing tool, a shaft to rotate said tool in said container and means to connect said tool to said shaft, said means comprising a sleeve, means to detachably secure said tool to one end of said sleeve, and means to secure said sleeve to said shaft, said sleeve being axially movable to a more elevated position on said shaft to permit separation of said tool from said sleeve while within said container.

2. In a food mixing machine, a food container, a mixing tool, a shaft to rotate said tool in said container and means to connect said tool to said shaft, said means comprising a sleeve, means to detachably secure said tool to one end of said sleeve, and means to secure said sleeve to said shaft in any one of a plurality of axial positions, said sleeve being axially movable on said shaft to a position permitting separation of the tool therefrom while within said container.

In testimony whereof we hereunto affix our signatures in the presence of two witnesses.

JOSEPHINE TRUST.
HENRY TRUST.

Witnesses:
MADELINE C. FOERST,
DAVID H. DOUGLASS.